United States Patent [19]

Shy

[11] Patent Number: 5,198,937
[45] Date of Patent: Mar. 30, 1993

[54] IN-CAR REARVIEW MIRROR STRUCTURE

[75] Inventor: Jack Shy, Changhwa, Taiwan

[73] Assignee: Shin Jye Auto Accessories Co., Ltd., Changhwa, Taiwan

[21] Appl. No.: 806,186

[22] Filed: Dec. 13, 1991

[51] Int. Cl.$^5$ ............................ G02B 7/18; B60R 1/04
[52] U.S. Cl. ................................. 359/844; 359/871; 359/872; 248/467; 248/476; 248/488
[58] Field of Search .............. 359/838, 871, 872, 870, 359/881, 841, 844, 846, 850, 854, 855, 865; 248/467, 475.1, 488, 468, 476, 477, 478, 489

[56] References Cited

U.S. PATENT DOCUMENTS

| | | | |
|---|---|---|---|
| 1,875,554 | 9/1932 | Bell | 248/488 |
| 1,969,415 | 8/1934 | Ostroff | 359/854 |
| 2,605,676 | 8/1952 | Couch | 359/854 |
| 2,802,394 | 8/1957 | Krone | 359/854 |
| 3,063,344 | 11/1962 | Slate | 359/871 |
| 3,954,328 | 5/1976 | Ames | 359/865 |
| 5,124,847 | 6/1992 | Gong | 359/854 |

FOREIGN PATENT DOCUMENTS 1058121  2/1987  United Kingdom ................ 359/871

Primary Examiner—Bruce Y. Arnold
Assistant Examiner—R. D. Shafer
Attorney, Agent, or Firm—Browdy and Neimark

[57] ABSTRACT

An improved in-car rearview mirror structure including a mirror frame seat and a mirror, wherein the upper and lower edges of the mirror frame seat are formed with two grooves respectively and two C-shaped protecting frames are mounted on two sides of the mirror, the length of the protecting frames being adjustable in accordance with the length of the mirror, the mirror with the protecting frames being fitted into the grooves of the mirror frame seat to form an in-car rearview mirror structure, an adhesive tape being attached to the rear face of the mirror for preventing the mirror from crashing due to collision.

1 Claim, 2 Drawing Sheets

IN-CAR REARVIEW MIRROR STRUCTURE

BACKGROUND OF THE INVENTION

The present invention relates to an improved in-car rearview mirror structure including a mirror frame seat and a mirror, wherein the upper and lower edges of the mirror frame seat are respectively formed with two grooves and two C-shaped protecting frames are mounted on two sides of the mirror. The length of the protecting frames can be adjusted according to the length of the mirror. The mirror with the protecting frames can be fitted in the grooves of the mirror frame seat to form an in-car rearview mirror. An adhesive tape is attached to the rear face of the mirror for preventing the mirror from crashing due to collision.

As shown in FIGS. 1 and 2, the conventional in-car rearview mirror includes a mirror frame seat 1 and a mirror 2 mounted therein. The upper edge of the back of the mirror frame seat 1 is provided with two fixed claws 11 and the lower edge thereof is provided with two elastic movable claws 12 whereby these claws can clamp the original in-car relatively small rearview mirror for affixing the additional relatively large rearview mirror thereto to enlarge the rear view.

Various in-car rearview mirrors with a dimension range from 24 cm to 33 cm are available in current markets. As a result, the manufacturers often expend great cost in manufacturing the molds for producing different specifications of in-car rearview mirrors to satisfy different consumers.

SUMMARY OF THE INVENTION

It is therefore a primary object of this invention to provide an improved in-car rearview mirror structure including a mirror frame seat with single specification, which can be associated with different dimensions of in-car rearview mirrors.

According to the above object, the present invention includes a mirror frame seat with a certain specification. The upper and lower edges of the mirror frame seat are respectively formed with two grooves and two C-shaped protecting frames are mounted on two sides of the rearview mirror with various specifications. The length of the protecting frames can be adjusted in accordance with the length of the mirror whereby the mirror with the protecting frame can be fitted in the grooves of the mirror frame seat to form different specifications of in-car rearview mirror assemblies. As a consequence, the drawbacks existing in conventional in-car rearview mirror with wrapping type of mirror frame which can not suit various specifications of mirrors can be eliminated and the manufacture of the in-car rearview mirror is facilitated.

DETAILED DESCRIPTION OF THE PREFERRED EMBODIMENT

Figure 1:
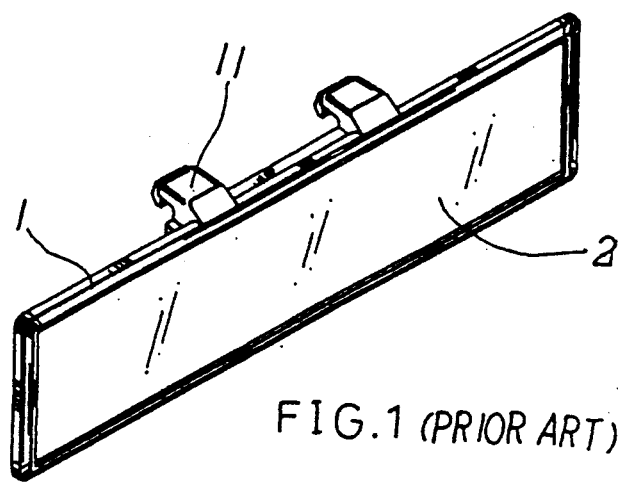
FIG.1 is a perspective view of the prior in-car rearview mirror.
Figure 2:
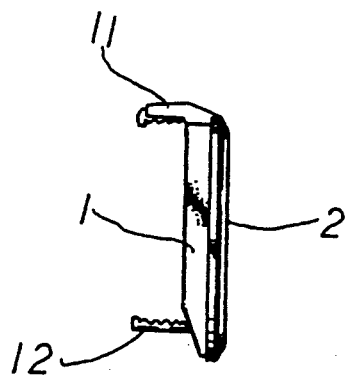
FIG.2 is a side view thereof.
Figure 6:
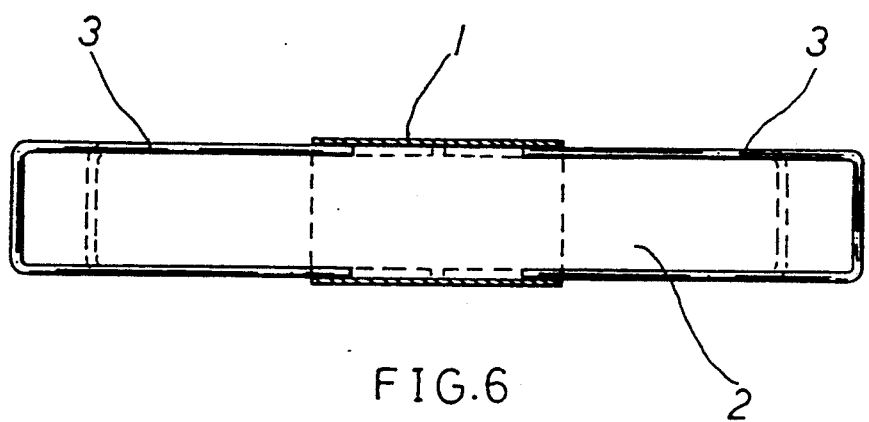
FIG.6 shows that the protecting frames can be adjusted according to the length of the mirror.
Figure 3:
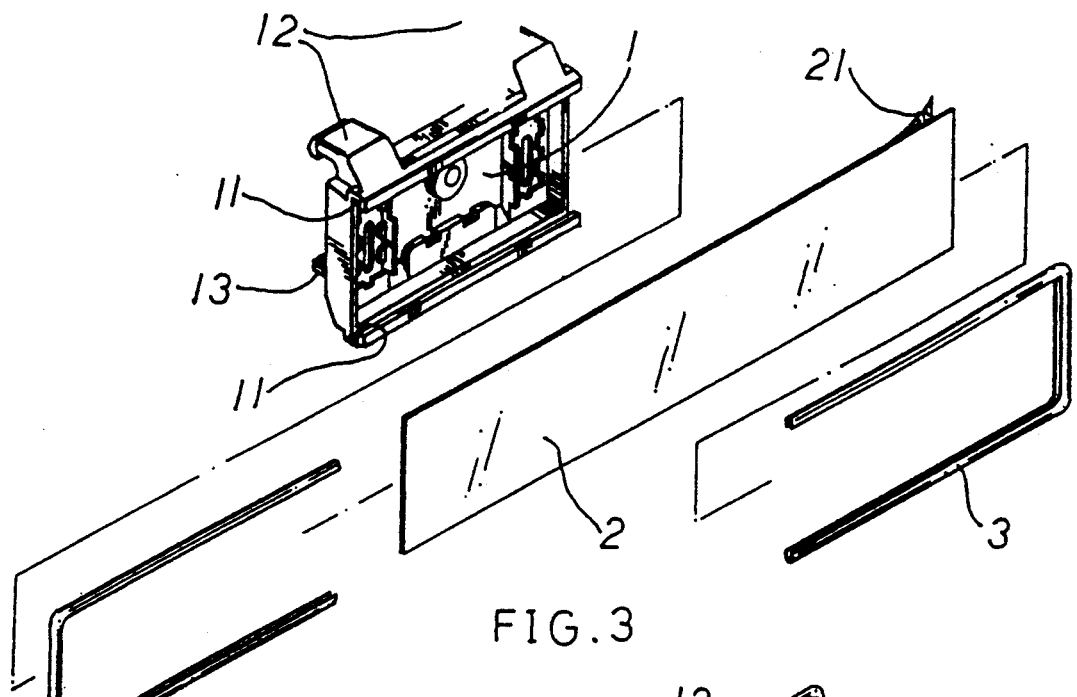
FIG.3 is a perspective exploded view of this invention.
Figure 4:
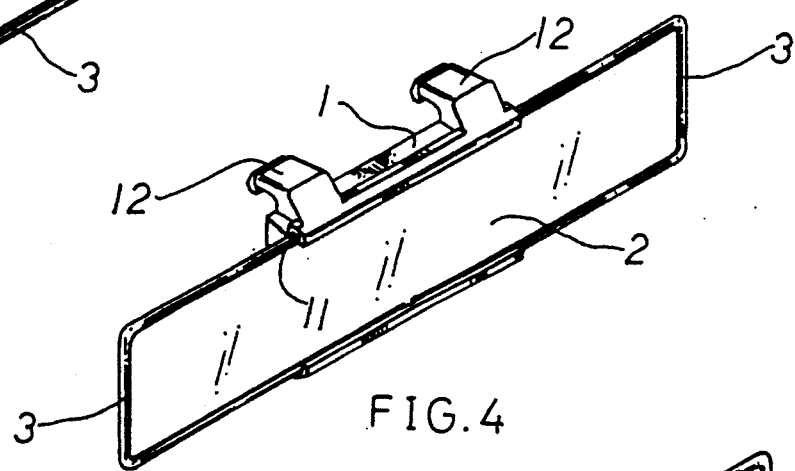
FIG.4 is a perspective assembled view of this invention in a short pattern.
Figure 5:
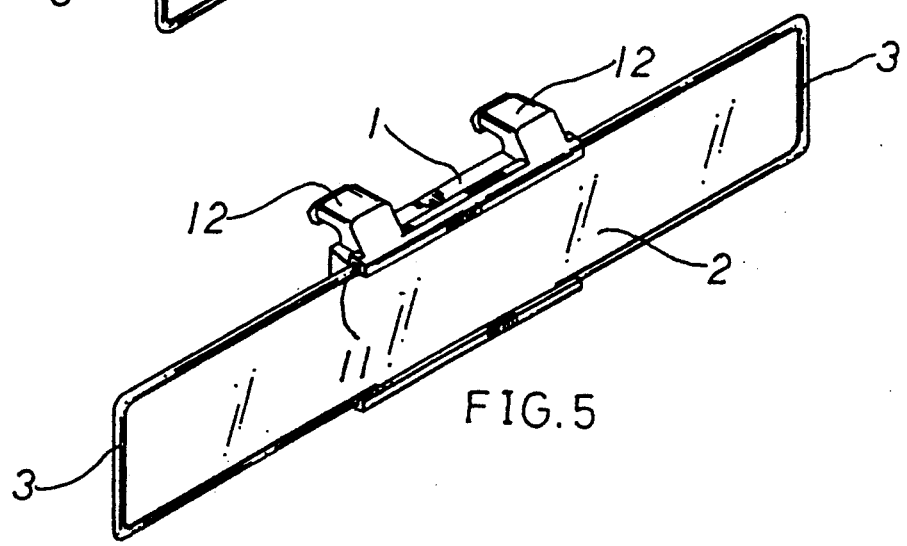
FIG.5 is a perspective assembled view of this invention in a long pattern.

Please refer to FIG. 3. The present invention includes a mirror frame seat 1 formed with an upper and a lower grooves 11 for fitting mirrors 2 with various lengths therein. The upper edge of the back of the mirror frame seat 1 is disposed with a pair of fixed claws 12 and the lower edge thereof is provided with a pair of elastic movable claws 13. The two pairs of claws 12, 13 can clamp the original rearview mirror in the car. An adhesive tape 21 can be attached to the rear surface of the mirror 2 and two C-shaped protecting frames 3 can be mounted on two sides of the mirror 2 as shown in FIG. 6. The length of the protective frames 3 can be adjusted in accordance with the length of the mirror 2. The mirror 2 with protecting frames 3 they can be fitted into the grooves 11 of the mirror frame seat 1. FIGS. 4 and 5 respectively show a short and a long in-car rearview mirror, assemblies.

What is claimed is:

1. In an in-car rearview mirror structure comprising a mirror frame seat and a mirror, an upper edge of a back of said mirror frame seat having a pair of fixed claws and a lower edge thereof being provided with a pair of elastic movable claws, said mirror frame seat having a front face with an upper edge and a lower edge, the improvement wherein the upper edge and lower edge of the front face of said mirror frame seat are formed with grooves, and two C-shaped protecting frames are mounted on two sides of said mirror, the length of said protecting frames being adjustable in accordance with the length of said mirror, said mirror with said protecting frames being fitted into said grooves of said mirror frame seat to form an in-car rearview mirror assembly.

* * * * *